May 1, 1956     C. H. CAMPBELL ET AL     2,743,748
DEVICE FOR FABRICATING CORK COMPOSITION AND SIMILAR ARTICLES
Filed Sept. 29, 1952
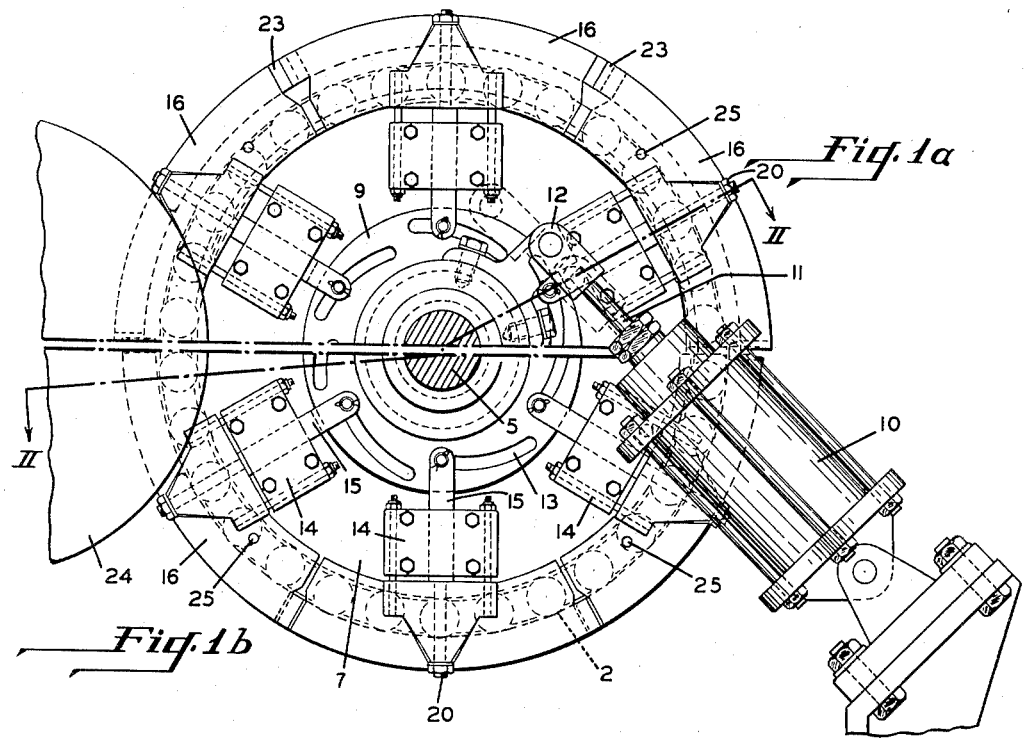
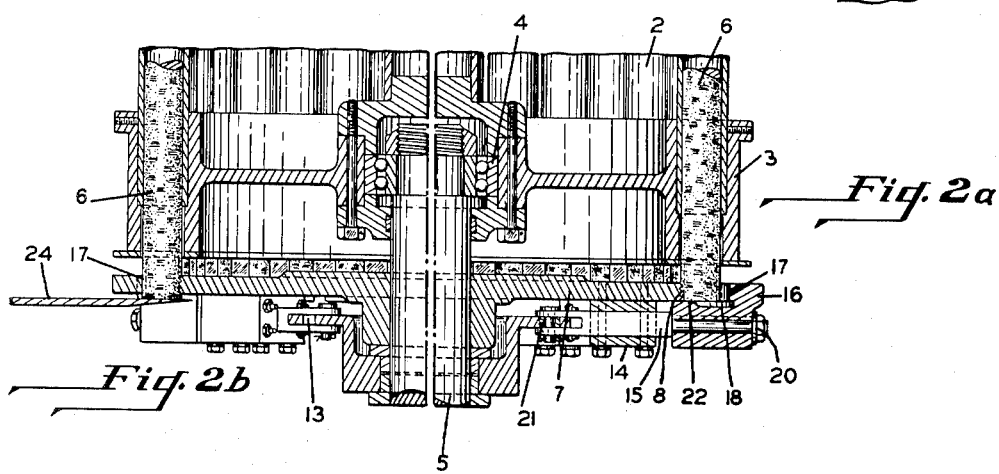
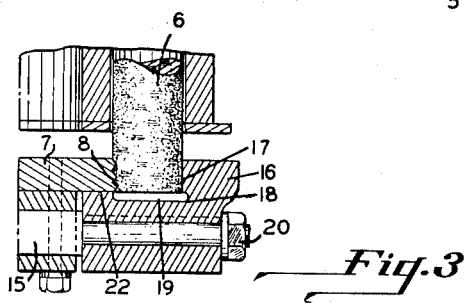
INVENTOR
CHARLES H. CAMPBELL
LUTHER E. GAENZLE
REX A. YOUNG
ATTORNEY

United States Patent Office 2,743,748
Patented May 1, 1956

2,743,748

DEVICE FOR FABRICATING CORK COMPOSITION AND SIMILAR ARTICLES

Charles H. Campbell, Lancaster Township, Lancaster County, and Luther E. Gaenzle and Rex A. Young, Lancaster, Pa., assignors to Armstrong Cork Company, Lancaster, Pa., a corporation of Pennsylvania Application September 29, 1952, Serial No. 312,076

3 Claims. (Cl. 144—21)

This invention relates to an apparatus for fabricating cork composition and similar articles and more particularly to an apparatus for slicing cork composition discs from cylindrical rods of cork composition.

In the manufacture of cork composition discs such as those used for sealing liners in container closures, rods of cork composition are disposed in a plurality of tubes mounted on a rotary turret which revolves about a horizontal axis. Means are provided for progressively feeding the rod through the tubes beyond the end thereof as the turret rotates. A disc knife, rotating in a path which intersects the periphery of the turret, severs thin discs from the rods as they are sequentially presented to the knife during rotation of the turret.

Positioned adjacent to the ends of the tubes through which the rods project for severance is a fixed circular feeding plate having an inwardly tapered annular groove therein in alignment with the turret tubes. The forward movement of the rods through the tubes is accomplished by a pair of helical threads formed in the inner and outer tapered walls of the annular groove. The pitch of the threads in the feeder plate is the equivalent of the thickness of the cork composition disc desired to be severed from the rods. The ends of the rods project from the turret tubes into the annular groove in the feeding plate, and the side of the rod is engaged by the threads at two diametrically opposite points. In this arrangement, each rod is advanced through the tube a distance substantially equivalent to the pitch of the thread on the stationary feeder plate upon each revolution of the turret, and a disc is severed from each rod upon each revolution.

The threads on the walls of the groove make it impossible in loading the turret to position the rods against a positive stop; they are merely partially entered into the tapered groove until engagement between the rods and the thread formations on the walls of the groove limits further movement.

This manner of loading the device results in considerable scrap loss due to the fact that when the machine is started after the loading, the rods are not all advanced to the point where discs are cut therefrom on the first or second revolution of the turret. Until all of the rods have been advanced sufficiently far for the knife to engage them and sever a full disc from each rod, the discs and portions of discs are turned to scrap. With a thirty tube turret, for instance, a large scrap loss results.

In order to overcome the disadvantages of the prior art slicers, we have developed a machine providing a positive stop which is positioned to engage the ends of the cork rods as they are loaded into the turret and to locate the ends of the rods each in a predetermined position for severance upon rotation of the turret. Thus, upon the first revolution of the turret, the end discs, which will be rough and irregular in thickness, may be fed to scrap and thereafter all or substantially all subsequent discs will be of proper thickness for use. During the loading operation, the rod-advancing arrangement is temporarily disengaged so that the rods can easily be positioned manually against the positive stop.

An object of this invention is to provide a disc slicer in which the rods to be severed may be loaded in a revolving turret with each rod disposed in a predetermined position for severance.

Another object of the invention is to provide a turret type disc slicer which may be manually loaded with rods to be severed, with each rod assuming essentially the same axial position with respect to the cutting knife as the others so that after the first revolution of the turret, full thickness discs will be severed from all of the rods.

In order that this invention may be more readily understood, it will be described in connection with the attached drawing in which:

Figure 1a is a front elevational view of the device with the rod stops in operative position for engagement with the ends of the rods;

Figure 1b is the same view showing the rod stops withdrawn to inoperative position so that the rods can advance for severance;

Figure 2a is a cross sectional view taken on the line II—II of Figure 1a;

Figure 2b is a cross sectional view taken on the line II—II of Figure 1b; and

Figure 3 is a detailed sectional view to enlarged scale showing a cork composition rod in the device with the rod stop withdrawn to inoperative position so that the rod can advance.

The device comprises a plurality of tubes 2 which are mounted on a spider 3 having a central bearing 4 mounted for rotation about a fixed shaft 5. Figures 2a and 2b show only the spider at the cutting end of the device, and it will be understood that a similar arrangement is located at the feed end or rear of the machine to support the tubes at the other end of the turret. The arrangement shown is conventional in turret type disc slicing machines.

The sectional views 2a and 2b show two cork rods 6 in two of the tubes. Positioned across the front of the machine is a stationary feeding plate 7. The turret is rotated by means of a motor and belt drive not shown on this drawing. The outer periphery of the stationary plate 7 is provided with a helical thread formation 8 which engages the side of the cork rods in the tubes. The pitch of the thread 8 on the plate 7 is such that the rods in engagement with the threads will advance on each revolution of the turret a distance equal to the thickness of the discs desired to be cut from the rods. It will be understood that in an arrangement of this type, as the turret rotates, carrying the rod over threads on the periphery of the stationary plate 7, the thread will advance the rod through the tube. Mounted on the shaft 5 but not keyed thereto is an actuator plate 9 which is capable of limited rotation. This limited rotation is effected by an air cylinder 10 operating a plunger 11 which by means of link 12 is attached to the actuator plate 9. The actuator plate 9 is provided with a plurality of eccentric tracks 13.

Mounted on the stationary plate 7 are a plurality of bearing blocks 14, each one of which carries a plunger shaft 15 passing therethrough. Attached to the end of the shafts 15 are a plurality of segments 16. These segments completely surround the outside of the device and in the particular embodiment shown are six in number. These segments, when in normal operating position, have a shoulder or clamping surface 17 which is in engagement with the outer surface of the cork rod as the rod is carried in its circular path in the turret, clamping the rod firmly in engagement with the threads 8 on the plate 7. The segments 16 have a stepped surface adjacent the end of the tubes. During normal operation of the device, the bottom of the groove 19 is disposed over the end of the tube. This groove 19 is of sufficient depth that the bottom thereof is disposed away from the end of the tube a distance at least as great as the distance the rod will advance through one revolution of the turret. This provides a recess or groove 19 into which the end of the rod can advance before a disc is cut therefrom. Each segment 16 is attached to a plunger 15 by means of bolt 20. The other end of the plunger 15 carries a roller 21 which operates in the eccentric track 13 in the plate 9. The arrangement of the eccentric tracks in the plate 9 is such that rotation of the plate 9 in a clockwise direction will move the plungers 15 in an outwardly direction and carry with them the segments 16. When the segment 16 moves outwardly, the land 22 on the inner circumference of the segment is brought into line with the opening at the end of the tube. This land 22 is on substantially the same plane as the end of the tube so that a rod being forced into the tube will strike the land 22 and will not advance beyond that point. After the turret has been loaded, the air cylinder 10 is again actuated and the plate 7 is moved in a counterclockwise direction, which pulls the plungers 15 toward the center of the device and brings the segments into clamping engagement with the cork rods as shown in Figure 3. The segments 16 are dovetailed into one another at the joint 23 between adjacent segments in such manner that when the segments are in their inner position during normal operation of the device, they form a smooth clamping surface along which the rods will freely slide. It will be noted from an observation of Figures 1b and 2b that a rotating knife 24 intersects the path of travel of the cork rods at one side of the machine. In this area in which the knife intersects the rods and cuts discs therefrom it is necessary only to provide the shoulder 17 for clamping engagement with the outer edge of the cork rod, inasmuch as the knife itself serves as a stop against which the rods may be inserted.

When the cutting operation has been completed for a group of rods, it is possible that small fragments of rods may be remaining in some tubes. In order to remove these small fragments and also to remove any dust caused by the cutting operation, there are provided a plurality of air jets 25 which pass through the segments and are in alignment with the tubes. These air jets are connected to a suitable source of air under pressure by means of flexible tubes so that the connections will not be damaged by movement of the segments. When the cutting cycle is completed, the air is turned on the jets either automaticaly or manually and the air removes the fragments from the tubes while the turret is rotating, and the device is ready for reloading.

In the operation of this device, the machine is stopped, the air cylinder is actuated so that the plate 9 rotates in a clockwise direction, moving the plungers 15 outwardly and carrying with them the segments 16, bringing the land 22 of each segment 16 over the end of the tubes 2. With the land 22 in this position, the rods are inserted into the tube as far as possible until they engage the land 22. When this has been done, the air cylinder is again actuated, rotating the plate 9 in a clockwise direction, pulling the plungers 15 inwardly, carrying with them the segments 16 until the shoulder 17 on each segment engages the cork rods, clamping the rods into engagement with the threads 8 on plate 7. With the rods so clamped, the groove 19 is directly over the ends of the rods around the entire circumference of the machine. When this has been accomplished, the machine is started, the turret rotates, and the rods advance into the recess 19 by means of the helical threads 8 provided on the periphery of the stationary plate 7. When the path of travel of each rod is intersected by the knife 24, a disc is sliced from the end of the rod and the rod continues through another circular path, progressing forward until it comes to the knife again.

We claim:
1. In an apparatus of the type described, the elements comprising a tube through which a rod is progressively advanced a predetermined distance, cutting means to sever the end of said rod when the rod has advanced a predetermined distance in the tube, means for advancing said rod through said tube, a movable plate positioned over the longitudinal path of travel of the rod through the tube, the side of said movable plate adjacent to the end of said rod having a flat surface disposed on substantially the same plane as the plane of the cutting knife, a clamping surface carried by said movable plate for engagement with the side of said rod to urge the rod firmly into engagement with the rod-advancing means, and means for moving said movable plate radialy with respect to the longitudinal axis of the rod to present either the flat surface to the end of the rod or the clamping surface to the side of the rod.

2. In an apparatus of the type described, the elements comprising a turret having a plurality of tubes carrying rods of material to be severed into discs, a plate positioned adjacent the end of the tubes in such manner that the periphery of the plate engages the side of the rods positioned in said tubes, a plurality of radially movable segments attached to said plate and positioned over the ends of said tubes, the side of each said segment adjacent the ends of said rods having a flat surface to serve as a stop for the corresponding one of the rods as they are placed in the tubes when said segments are in their radially extended position, a clamping surface on the corresponding one of the radially movable segments for engagement with the side of said rod to urge the rod into engagement with the periphery of said plate when the segments are in their retracted position, means for effecting relative rotary movement between said turret and said plate, rod-advancing means on the periphery of said plate in engagement with said rods to progressively advance said rods a predetermined distance upon each revolution of the device, and cutting means positioned in the path of travel of the ends of said rods to sever the end of each rod on each revolution of the device.

3. In an apparatus of the type described, the elements comprising a revolving turret having a plurality of tubes through which rods of cork composition are advanced progressively a predetermined distance on each revolution of the turret, cutting means to sever the end of each rod upon each revolution of the turret, a stationary feed plate positioned adjacent the end of said turret, means on said feed plate for engagement with the side of said rods for progressively advancing said rods through said tubes while said turret is revolving, a plurality of segments mounted on said feed plate for radial movement with respect thereto, said segments being positioned over the longitudinal path of travel of the rods through the tubes, the side of each of said segments adjacent to the end of said rods being a flat surface disposed on substantialy the same plane as the plane of the cutting knife to engage the end of the corresponding one of the rods as they are loaded into the turret, a clamping surface on each segment for engagement with the side of the rod to urge said rod into engagement with said rod-advancing means during each revolution of the turret, and means for moving said segments to present either the flat surface to the end of the rod or the clamping surface to the side of the rod.

References Cited in the file of this patent
UNITED STATES PATENTS

| 850,519 | Busch | Apr. 16, 1907 |
| 2,328,712 | Domke | Sept. 7, 1943 |

FOREIGN PATENTS

| 28,052 | Great Britain | Dec. 19, 1907 |